(12) United States Patent
Arai

(10) Patent No.: US 9,200,210 B2
(45) Date of Patent: Dec. 1, 2015

(54) METHOD FOR STOPPING OPERATION OF REACTOR

(75) Inventor: Shinya Arai, Shizuoka (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 14/007,473

(22) PCT Filed: Mar. 15, 2012

(86) PCT No.: PCT/JP2012/056749
§ 371 (c)(1),
(2), (4) Date: Sep. 25, 2013

(87) PCT Pub. No.: WO2012/132941
PCT Pub. Date: Oct. 4, 2012

(65) Prior Publication Data
US 2014/0011896 A1 Jan. 9, 2014

(30) Foreign Application Priority Data
Mar. 30, 2011 (JP) ................. 2011-074245

(51) Int. Cl.
C07C 27/00 (2006.01)
C10G 3/00 (2006.01)
C10G 2/00 (2006.01)

(52) U.S. Cl.
CPC .. *C10G 3/60* (2013.01); *C10G 2/33* (2013.01); *C10G 2/342* (2013.01); *C10G 2300/4031* (2013.01)

(58) Field of Classification Search
CPC ............ C10G 3/60; C10G 2/33; C10G 2/342; C10G 2300/4031
USPC .......................................................... 518/700
See application file for complete search history.

(56) References Cited

U.S. PATENT DOCUMENTS 2,779,802 A * 1/1957 Harlan, Jr. .................... 568/882
4,623,668 A * 11/1986 Broecker et al. .............. 518/709
(Continued)

FOREIGN PATENT DOCUMENTS

GB 660737 A 11/1951
GB 785991 A 11/1957
(Continued)

OTHER PUBLICATIONS

Int'l Search Report issued Apr. 17, 2012 in Int'l Application No. PCT/JP2012/056749.
(Continued)

*Primary Examiner* — Jafar Parsa
*Assistant Examiner* — Amy C Bonaparte
(74) *Attorney, Agent, or Firm* — Panitch Schwarze Belisario & Nadel LLP

(57) ABSTRACT

The method for stopping operation of a reactor is provided with a stop step of stopping supply of a synthesis gas containing a carbon monoxide gas and a hydrogen gas into the reactor; a slurry discharge step of discharging slurry from the reactor; a steam supply step of supplying steam higher in temperature than the decomposition temperatures of metal carbonyls into the reactor, thereby discharging gaseous matters inside the reactor; and a carbon monoxide gas detecting step of detecting an amount of carbon monoxide gas contained in the gaseous matters discharged from the reactor. In the steam supply step, supply of the steam is stopped when an amount of the detected carbon monoxide gas continuously declines to be lower than a predetermined reference value.

2 Claims, 1 Drawing Sheet

(56) References Cited

U.S. PATENT DOCUMENTS

| | | | |
|---|---|---|---|
| 5,196,345 A * | 3/1993 | Cooper et al. | 436/55 |
| 6,512,017 B1 * | 1/2003 | Steynberg et al. | 518/712 |
| 6,559,191 B1 | 5/2003 | Koveal et al. | |
| 2007/0281203 A1 | 12/2007 | Kobayashi et al. | |
| 2010/0160462 A1 | 6/2010 | Remans et al. | |

FOREIGN PATENT DOCUMENTS

| | | |
|---|---|---|
| JP | 2001-524155 A | 11/2001 |
| JP | 2002-520423 A | 7/2002 |
| JP | 2003-292972 A | 10/2003 |
| JP | 2007-319737 A | 12/2007 |
| WO | 9850491 A1 | 11/1998 |
| WO | 0002644 A1 | 1/2000 |
| WO | 2005026292 A1 | 3/2005 |
| WO | 2009011133 A1 | 1/2009 |
| WO | 2010038396 A1 | 4/2010 |

OTHER PUBLICATIONS

Extended European search report issued Oct. 7, 2014 in EP Application No. 12763276.8.

Notice of Allowance issued Apr. 1, 2015 in JP Application No. 2011-074245.

* cited by examiner

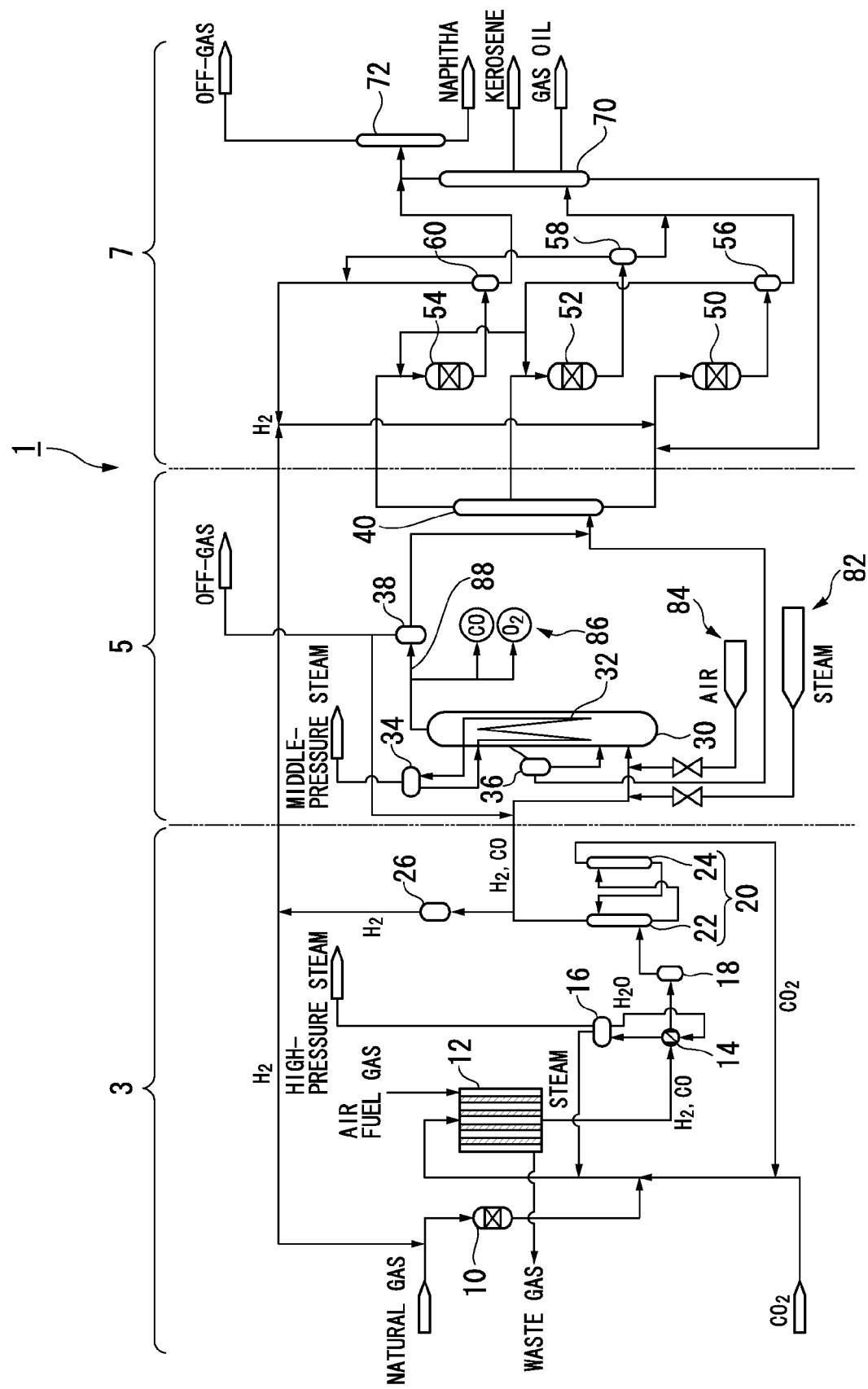

METHOD FOR STOPPING OPERATION OF REACTOR

CROSS-REFERENCE TO RELATED APPLICATION

This application is a Section 371 of International Application No. PCT/JP2012/056749, filed Mar. 15, 2012, which was published in the Japanese language on Oct. 4, 2012, under International Publication No. WO 2012/132941 A1, and the disclosure of which is incorporated herein by reference.

BACKGROUND OF THE INVENTION

1. Field of the Invention

The present invention relates to a method for stopping operation of a reactor.

Priority is claimed on Japanese Patent Application No. 2011-074245 filed on Mar. 30, 2011, the content of which is incorporated herein by reference.

2. Description of Related Art

In recent years, as a process for synthesizing liquid fuels from natural gas, the GTL (Gas To Liquids: liquid fuels synthesis) technique has been developed. This GTL technique includes the steps of reforming a natural gas to produce a synthesis gas containing carbon monoxide gas (CO) and hydrogen gas ($H_2$) as main components, synthesizing hydrocarbons using this synthesis gas as a feedstock gas and using a catalyst via the Fischer-Tropsch synthesis reaction (hereinafter also referred to as the "FT synthesis reaction"), and then hydrogenating and fractionating these hydrocarbons to produce liquid fuel products such as naphtha (raw gasoline), kerosene, gas oil and wax and the like.

In the hydrocarbon synthesis reaction apparatus used in this GTL technique, the hydrocarbons are synthesized by subjecting the carbon monoxide gas and hydrogen gas within the synthesis gas to an FT synthesis reaction inside a reactor main unit that contains a slurry prepared by suspending solid catalyst particles (such as a cobalt catalyst or the like) in a liquid medium (for example, liquid hydrocarbons or the like).

Moreover, in the hydrocarbon synthesis reaction apparatus, since carbon monoxide is contained in a synthesis gas, metal carbonyls (such as an iron carbonyl and a nickel carbonyl) are easily produced inside a reactor. There is a desire to remove these metal carbonyls from the reactor when operation of the reactor is stopped.

As catalysts for removing metal carbonyls, for example, there are known those described in Patent Document 1 given below.

CITATION LIST

Patent Document

Patent Document 1: U.S. Patent Application Publication No. 2007-0281203

SUMMARY OF THE INVENTION

Problem to be Solved

However, a great amount of catalysts is required for catalytic removal of metal carbonyls from a reactor, which is not practically feasible.

The present invention has been made in view of the above situation, an object of which is to provide a method for stopping operation of a reactor which is capable of removing effectively metal carbonyls inside the reactor.

Means for Solving the Problem

The method for stopping operation of a reactor in the present invention is performed after hydrocarbon compounds are synthesized by supplying a synthesis gas containing a carbon monoxide gas and a hydrogen gas into the reactor which accommodates slurry. This method for stopping operation of a reactor includes; a stop step of stopping supply of the synthesis gas into the reactor; a slurry discharge step of discharging the slurry from the reactor after the stop step; a steam supply step of supplying steam higher in temperature than the decomposition temperatures of metal carbonyls into the reactor after the slurry discharge step, thereby discharging gaseous matters inside the reactor; and a carbon monoxide gas detecting step of detecting during the steam supply step an amount of carbon monoxide gas contained in the gaseous matters discharged from the reactor. In the steam supply step, supply of the steam is stopped when an amount of the detected carbon monoxide gas continuously declines to be lower than a predetermined reference value.

The decomposition temperatures may be in a range from 60° C. or higher to 200° C. or lower. Further, the reference value may be 50 vol ppm.

According to the present invention, steam higher in temperature than the decomposition temperatures of metal carbonyls is supplied into the reactor during the steam supply step. Thus, it is possible to decompose the metal carbonyls inside the reactor into metal oxides and a carbon monoxide gas.

At this time, gaseous matters inside the reactor are also discharged. Thus, the carbon monoxide gas generated by decomposition of the metal carbonyls can be also discharged from the reactor to conduct a steam purge inside the reactor. Thereby, it is possible to prevent reproduction of metal carbonyls by the decomposed carbon monoxide gas after decomposition of the metal carbonyls.

In this case, as described above, the carbon monoxide gas in gaseous matters discharged from the reactor is produced through decomposition of metal carbonyls inside the reactor. Therefore, the carbon monoxide gas is increased with an increase in residual amount of the metal carbonyls, while it is decreased with a decrease in residual amount of the metal carbonyls. That is, an amount of carbon monoxide gas discharged from the reactor has correlation with a residual amount of the metal carbonyls inside the reactor.

Then, since the above-described correlation exists, a continuously declining amount of the detected carbon monoxide gas during the steam supply step indicates that a residual amount of the metal carbonyls inside the reactor is continuously decreased. Therefore, when an amount of the detected carbon monoxide gas continuously declines to be lower than a predetermined reference value, a residual amount of the metal carbonyls inside the reactor is reliably decreased.

The method for stopping operation of a reactor in the present invention may also be provided with an inert gas filling step of filling an inert gas into the reactor after the slurry discharge step and before the steam supply step.

The method for stopping operation of a reactor in the present invention may be provided with an air supply step of supplying air into the reactor after the steam supply step and discharges gaseous matter into the reactor, and an oxygen gas detecting step of detecting during the air supply step an amount of oxygen gas in the gaseous matters discharged from the reactor. In the air supply step, supply of air is stopped on the basis of the amount of the detected oxygen gas.

In the air supply step, supply of air may be stopped when the amount of the detected oxygen gas is 20 vol % or more in terms of the content ratio inside the gaseous matters.

According to the present invention, it is possible to estimate during the air supply step the amount of oxygen gas inside the reactor on the basis of the amount of detected oxygen gas discharged from the reactor.

Advantageous Effect of the Invention

According to the present invention, metal carbonyls inside the reactor can be decomposed into metal oxides and a carbon monoxide gas. After decomposition of the metal carbonyls, the decomposed carbon monoxide gas is used to prevent reproduction of metal carbonyls. Thus, it is possible to effectively remove the metal carbonyls inside the reactor.

Further, during the steam supply step, supply of steam is stopped when the amount of the detected carbon monoxide gas continuously declines to be lower than a predetermined reference value. Thus, the supply of steam can be stopped when a residual amount of metal carbonyls inside the reactor is reliably decreased.

Still further, during the steam supply step, the supply of steam is stopped on the basis of an amount of the detected carbon monoxide gas. Thereby, after sufficient removal of the metal carbonyls, steam is not continuously supplied into the reactor but can be stopped for the supply, thus making it possible to smoothly stop operation of the reactor.

According to the present invention, the inert gas filling step is conducted after the slurry discharge step and before the steam supply step. Thus, an inert gas is allowed to be filled inside the reactor during the steam supply step. It is, thereby, possible to effectively decompose metal carbonyls inside the reactor into metal oxides and a carbon monoxide gas during the steam supply step.

According to the present invention, during the air supply step, the oxygen gas detecting step can be conducted to estimate the amount of oxygen gas inside the reactor. Thus, it is possible to determine whether or not an oxygen gas exists at such an amount that can permit an operator to work inside the reactor, for example. It is, thereby, possible to smoothly stop operation of the reactor even when an operator works inside the reactor, for example, after the air supply step.

BRIEF DESCRIPTION OF THE DRAWING

FIG. 1 is a schematic view which shows the entire constitution of a liquid fuel synthesizing system to which a method is applicable for stopping operation of a reactor in one embodiment of the present invention.

DETAILED DESCRIPTION OF THE INVENTION

Hereinafter, a description will be given of one embodiment of the liquid fuel synthesizing system to which the method is applicable for stopping operation of a reactor in one embodiment of the present invention with reference to the drawing.
(Liquid Fuel Synthesizing System)

As illustrated in FIG. 1, the liquid fuel synthesizing system (hydrocarbon synthesis reaction system) 1 is a plant facility which carries out a GTL process that converts a hydrocarbon feedstock such as a natural gas into liquid fuel. This liquid fuel synthesizing system 1 includes a synthesis gas production unit 3, an FT synthesis unit (hydrocarbon synthesis reaction apparatus) 5, and an upgrading unit 7. The synthesis gas production unit 3 reforms a natural gas that functions as a hydrocarbon feedstock to produce a synthesis gas containing carbon monoxide gas and hydrogen gas. The FT synthesizing unit 5 produces liquid hydrocarbon compounds from the produced synthesis gas via the FT synthesis reaction. The upgrading unit 7 hydrotreats the liquid hydrocarbon compounds synthesized by the FT synthesis reaction to produce liquid fuels and other products (such as naphtha, kerosene, gas oil, and wax). Structural elements of each of these units are described below.

First is a description of the synthesis gas production unit 3.

The synthesis gas production unit 3 is, for example, composed mainly of a desulfurization reactor 10, a reformer 12, a waste heat boiler 14, gas-liquid separators 16 and 18, a $CO_2$ removal unit 20, and a hydrogen separator 26. The desulfurization reactor 10 is composed of a hydrodesulfurizer and the like, and removes sulfur components from the natural gas that functions as the feedstock. The reformer 12 reforms the natural gas supplied from the desulfurization reactor 10 to produce a synthesis gas containing carbon monoxide gas (CO) and hydrogen gas ($H_2$) as main components. The waste heat boiler 14 recovers waste heat from the synthesis gas produced in the reformer 12 to generate a high-pressure steam. The gas-liquid separator 16 separates the water that has been heated by heat exchange with the synthesis gas in the waste heat boiler 14 into a gas (high-pressure steam) and a liquid. The gas-liquid separator 18 removes a condensed component from the synthesis gas that has been cooled in the waste heat boiler 14, and supplies a gas component to the $CO_2$ removal unit 20. The $CO_2$ removal unit 20 has an absorption tower (second absorption tower) 22 and a regeneration tower 24. The absorption tower 22 uses an absorbent to absorb carbon dioxide gas contained in the synthesis gas supplied from the gas-liquid separator 18. The regeneration tower 24 strips the carbon dioxide gas absorbed by the absorbent, thereby regenerating the absorbent. The hydrogen separator 26 separates a portion of the hydrogen gas contained in the synthesis gas from which the carbon dioxide gas has already been separated by the $CO_2$ removal unit 20. In some cases, the above $CO_2$ removal unit 20 may not need to be provided.

In the reformer 12, for example, by utilizing a steam and carbon dioxide gas reforming method represented by the chemical reaction formulas (1) and (2) shown below, the natural gas is reformed by carbon dioxide and steam, and a high-temperature synthesis gas is produced which includes carbon monoxide gas and hydrogen gas as main components. However, the reforming method employed in the reformer 12 is not limited to this steam and carbon dioxide gas reforming method. For example, a steam reforming method, a partial oxidation reforming method (POX) using oxygen, an autothermal reforming method (ATR) that is a combination of a partial oxidation reforming method and a steam reforming method, or a carbon dioxide gas reforming method and so on, may also be used.

Chemical Formula 1:

$$CH_4 + H_2O \rightarrow CO + 3H_2 \tag{1}$$

$$CH_4 + CO_2 \rightarrow 2CO + 2H_2 \tag{2}$$

The hydrogen separator 26 is provided on a branch line that branches off a main line which connects the $CO_2$ removal unit 20 or the gas-liquid separator 18 with a slurry bubble column reactor 30. This hydrogen separator 26 may be composed of, for example, f a hydrogen PSA (Pressure Swing Adsorption) apparatus that performs adsorption and desorption of hydrogen by utilizing a pressure difference. This hydrogen PSA apparatus has adsorbents (such as a zeolitic adsorbent, activated carbon, alumina or silica gel) packed inside a plurality of adsorption towers (not shown in the drawing) that are arranged in parallel. By sequentially repeating each of the steps of hydrogen pressurization, adsorption, desorption (depressurization) and purging within each of these adsorption towers, the hydrogen PSA apparatus can continuously supply a high-purity hydrogen gas (of, for example, approximately 99.999% purity) that has been separated from the synthesis gas.

The hydrogen gas separating method employed in the hydrogen separator 26 is not limited to the type of pressure swing adsorption method utilized by the above hydrogen PSA apparatus, and for example, a hydrogen storing alloy adsorption method, a membrane separation method, or a combination thereof may also be used.

The hydrogen storing alloy method is a technique for separating hydrogen gas using, for example, a hydrogen storing alloy (such as $TiFe$, $LaNi_5$, $TiFe_{(0.7\ to\ 0.9)}Mn_{(0.3\ to\ 0.1)}$, or $TiMn_{1.5}$) that exhibits hydrogen adsorption and strip properties upon cooling and heating, respectively. In the hydrogen storing alloy method, for example, hydrogen adsorption by cooling the hydrogen storing alloy, and hydrogen strip by heating the hydrogen storing alloy may be repeated alternately within a plurality of adsorption towers containing the hydrogen storing alloy. In this manner, hydrogen gas contained in the synthesis gas can be separated and recovered.

The membrane separation method is a technique that uses a membrane composed of a polymer material such as an aromatic polyimide to separate hydrogen gas, which exhibits superior membrane permeability, from a mixed gas. Since the membrane separation method does not require a phase change of the separation target materials in order to achieve separation, less energy is required for the separation operation, meaning the running costs are low. Further, because the structure of a membrane separation device is simple and compact, the facility costs are low and the surface area required to install the facility is small. Moreover, there is no driving device in a separation membrane and the stable operating range is broad, which offers another advantage in that maintenance is comparatively easy.

Next is a description of the FT synthesis unit 5.

The FT synthesis unit 5 mainly includes, for example, the reactor 30, a gas-liquid separator 34, a separator 36, a gas-liquid separator 38, a first fractionator 40. The reactor 30 uses the FT synthesis reaction to synthesize liquid hydrocarbon compounds from the synthesis gas produced by the aforementioned synthesis gas production unit 3, that is, from carbon monoxide gas and hydrogen gas. The gas-liquid separator 34 separates water that has been heated by passage through a heat transfer tube 32 disposed inside the reactor 30 into steam (middle-pressure steam) and a liquid. The separator 36 is connected to the middle section of the reactor 30, and separates the catalyst and the liquid hydrocarbon compounds. The gas-liquid separator 38 is connected to the top of the reactor 30 and cools any unreacted synthesis gas and gaseous hydrocarbon compounds. The first fractionator 40 fractionally distills the liquid hydrocarbon compounds that have been supplied from the reactor 30 via the separator 36 and the gas-liquid separator 38 into a series of fractions.

The reactor 30 is an example of a reactor that synthesizes liquid hydrocarbon compounds from a synthesis gas, and functions as an FT synthesis reactor that synthesizes liquid hydrocarbon compounds from the synthesis gas by the FT synthesis reaction. The reactor 30 is formed from, for example, a bubble column slurry bed type reactor in which a slurry composed mainly of catalyst particles and an oil medium (liquid medium, liquid hydrocarbons) is contained inside a column type vessel. This reactor 30 synthesizes gaseous or liquid hydrocarbon compounds from the synthesis gas by the FT synthesis reaction. Specifically, in the reactor 30, a synthesis gas that represents the feedstock gas is supplied as gas bubbles from a dispersion plate positioned in the bottom of the reactor 30, and these gas bubbles pass through the slurry, which has been formed by suspending catalyst particles in the oil medium. In this suspended state, the hydrogen gas and carbon monoxide gas contained in the synthesis gas react with each other to synthesize hydrocarbon compounds, as shown in the following chemical reaction formula (3).

Chemical Formula 2:

$$2nH_2 + nCO \rightarrow (-CH_2-)_n + nH_2O \qquad (3)$$

In addition, because the FT synthesis reaction is an exothermic reaction, the reactor 30 is a heat exchange-type reactor having the heat transfer tube 32 disposed inside the reactor. The reactor 30 is supplied, for example, with water (BFW: Boiler Feed Water) as a coolant, so that the reaction heat of the FT synthesis reaction can be recovered in the form of a middle-pressure steam by heat exchange between the slurry and the water.

Next is a description of the upgrading unit 7. The upgrading unit 7 includes, for example, a wax fraction hydrocracking reactor 50, a middle distillate hydrotreating reactor 52, a naphtha fraction hydrotreating reactor 54, gas-liquid separators 56, 58 and 60, a second fractionator 70, and a naphtha stabilizer 72. The wax fraction hydrocracking reactor 50 is connected to the bottom of the first fractionator 40. The middle distillate hydrotreating reactor 52 is connected to a middle section of the first fractionator 40. The naphtha fraction hydrotreating reactor 54 is connected to the top of the first fractionator 40. The gas-liquid separators 56, 58 and 60 are provided so as to correspond to the hydrogenation reactors 50, 52 and 54 respectively. The second fractionator 70 fractionally distills the liquid hydrocarbon compounds supplied from the gas-liquid separators 56 and 58. The naphtha stabilizer 72 rectifies the liquid hydrocarbon compounds within the naphtha fraction supplied from the gas-liquid separator 60 and fractionally distilled in the second fractionator 70. As a result, the naphtha stabilizer 72 discharges butane and components lighter than butane as an off-gas, and recovers components having a carbon number of five or greater as a naphtha product.

Next is a description of a process for synthesizing liquid fuels from a natural gas (GTL process) using the liquid fuel synthesizing system 1 having the structure described above.

A natural gas (the main component of which is $CH_4$) is supplied as a hydrocarbon feedstock to the liquid fuel synthesizing system 1 from an external natural gas supply source (not shown in the drawing), such as a natural gas field or a natural gas plant. The above synthesis gas production unit 3 reforms the natural gas to produce a synthesis gas (a mixed gas containing carbon monoxide gas and hydrogen gas as main components).

Specifically, first, the natural gas described above is introduced to the desulfurization reactor 10 together with the hydrogen gas separated by the hydrogen separator 26. In the desulfurization reactor 10, sulfur components included in the natural gas are converted into hydrogen sulfide by the introduced hydrogen gas and the hydrodesulfurization catalyst. Further, in the desulfurization reactor 10, the produced hydrogen sulfide is absorbed and removed by a desulfurizing agent such as ZnO. By desulfurizing the natural gas in advance in this manner, reduction in the activity of the catalysts used in the reformer 12, the reactor 30 and so on, due to sulfur can be prevented.

The natural gas (which may also include carbon dioxide) that has been desulfurized in this manner is supplied to the reformer 12 after mixing with carbon dioxide gas ($CO_2$) supplied from a carbon dioxide supply source (not shown in the drawing) and the steam generated in the waste heat boiler 14. In the reformer 12, for example, the natural gas is reformed by the carbon dioxide gas and the steam via the aforementioned steam-carbon dioxide reforming process, thereby producing a high-temperature synthesis gas including carbon monoxide gas and hydrogen gas as main components. At this time, for example, a fuel gas and air for a burner installed in the reformer 12 are supplied to the reformer 12, and the combustion heat from the fuel gas in the burner is used to provide the necessary reaction heat for the above steam-carbon dioxide gas reforming reaction, which is an endothermic reaction.

The high-temperature synthesis gas (for example, 900° C., 2.0 MPaG) produced in the reformer 12 in this manner is supplied to the waste heat boiler 14, and is cooled (for example, to 400° C.) by heat exchange with the water circulating through the waste heat boiler 14, thereby recovering the waste heat from the synthesis gas.

At this time, the water heated by the synthesis gas in the waste heat boiler 14 is supplied to the gas-liquid separator 16. In the gas-liquid separator 16, the water that has been heated by the synthesis gas is separated into a high-pressure steam (for example, 3.4 to 10.0 MPaG) and water. The separated high-pressure steam is supplied to the reformer 12 or other external devices, whereas the separated water is returned to the waste heat boiler 14.

Meanwhile, the synthesis gas that has been cooled within the waste heat boiler 14 is supplied to either the absorption tower 22 of the $CO_2$ removal unit 20 or the reactor 30, after a condensed liquid fraction has been separated and removed from the synthesis gas in the gas-liquid separator 18. In the absorption tower 22, carbon dioxide gas contained in the synthesis gas is absorbed by an absorbent stored in the absorption tower 22, thereby removing the carbon dioxide gas from the synthesis gas. The absorbent that has absorbed the carbon dioxide gas within the absorption tower 22 is discharged from the absorption tower 22 and introduced into the regeneration tower 24. This absorbent that has been introduced into the regeneration tower 24 is then heated, for example, with steam, and subjected to a stripping treatment to strip the carbon dioxide gas. The striped carbon dioxide gas is discharged from the regeneration tower 24 and introduced into the reformer 12, where it can be reused for the above reforming reaction.

The synthesis gas produced in the synthesis gas production unit 3 in this manner is supplied to the reactor 30 of the above FT synthesis unit 5. At this time, the composition ratio of the synthesis gas supplied to the reactor 30 is adjusted to a composition ratio suitable for the FT synthesis reaction (for example, $H_2$:CO=2:1 (molar ratio)). In addition, the synthesis gas supplied to the reactor 30 is pressurized to a pressure suitable for the FT synthesis reaction (for example, approximately 3.6 MPaG) by a compressor (not shown in the drawing) provided in the line connecting the $CO_2$ removal unit 20 with the reactor 30.

Furthermore, a portion of the synthesis gas that has undergone separation of the carbon dioxide gas by the above $CO_2$ removal unit 20 is also supplied to the hydrogen separator 26. In the hydrogen separator 26, the hydrogen gas contained in the synthesis gas is separated by adsorption and desorption utilizing a pressure difference (hydrogen PSA) as described above. The separated hydrogen gas is supplied continuously from a gas holder or the like (not shown in the drawing) via a compressor (not shown in the drawing) to the various hydrogen-utilizing reactors (for example, the desulfurization reactor 10, the wax fraction hydrocracking reactor 50, the middle distillate hydrotreating reactor 52, the naphtha fraction hydrotreating reactor 54, and so on) within the liquid fuel synthesizing system 1 that performs predetermined reactions using hydrogen.

Next, the FT synthesis unit 5 synthesizes liquid hydrocarbon compounds by the FT synthesis reaction from the synthesis gas produced in the above synthesis gas production unit 3.

Specifically, the synthesis gas that has undergone separation of the carbon dioxide gas by the above $CO_2$ removal unit 20 is introduced into the reactor 30, and flows through the slurry including the catalyst contained in the reactor 30. During this time within the reactor 30, the carbon monoxide and hydrogen gas contained in the synthesis gas react with each other by the aforementioned FT synthesis reaction, and hydrocarbon compounds are produced. Moreover, during this FT synthesis reaction, the reaction heat of the FT synthesis reaction is recovered by the water flowing through the heat transfer tube 32 of the reactor 30, and the water that has been heated by this reaction heat is vaporized into steam. This steam is supplied to the gas-liquid separator 34 and separated into condensed water and a gas fraction. The water is returned to the heat transfer tube 32, while the gas fraction is supplied to an external device as a middle-pressure steam (for example, 1.0 to 2.5 MPaG).

The liquid hydrocarbon compounds synthesized in the reactor 30 in this manner are discharged from the middle section of the reactor 30 as a slurry that includes catalyst particles, and this slurry is introduced into the separator 36. In the separator 36, the introduced slurry is separated into the catalyst (the solid fraction) and a liquid fraction containing the liquid hydrocarbon compounds. A portion of the separated catalyst is returned to the reactor 30, whereas the liquid fraction is introduced into the first fractionator 40. Gaseous by-products, including unreacted synthesis gas from the FT synthesis reaction and gaseous hydrocarbon compounds produced in the FT synthesis reaction, are discharged from the top of the reactor 30. The gaseous by-products discharged from the reactor 30 are introduced into the gas-liquid separator 38. In the gas-liquid separator 38, the introduced gaseous by-products are cooled and separated into condensed liquid hydrocarbon compounds and a gas fraction. The separated liquid hydrocarbon compounds are discharged from the gas-liquid separator 38 and introduced into the first fractionator 40. The separated gas fraction is discharged from the gas-liquid separator 38, with a portion of the gas fraction being reintroduced into the reactor 30. In the reactor 30, the unreacted synthesis gases (CO and $H_2$) contained in this reintroduced gas fraction are reused for the FT synthesis reaction. Further, the remaining portion of the gas fraction discharged from the gas-liquid separator 38 may be used as an off-gas fuel, or fuels equivalent to LPG (Liquefied Petroleum Gas) may be recovered from the gas fraction.

In the first fractionator 40, the liquid hydrocarbon compounds (with various carbon numbers) supplied from the reactor 30 via the separator 36 and the gas-liquid separator 38 in the manner described above are fractionally distilled into a naphtha fraction (with a boiling point that is lower than approximately 150° C.), a middle distillate (with a boiling point of approximately 150 to 350° C.), and a wax fraction (with a boiling point that exceeds approximately 350° C.).

The liquid hydrocarbon compounds of the wax fraction (mainly $C_{21}$ or higher) discharged from the bottom of the first fractionator 40 are introduced into the wax fraction hydrocracking reactor 50. The liquid hydrocarbon compounds of the middle distillate equivalent to kerosene and gas oil (mainly $C_{11}$ to $C_{20}$) discharged from the middle section of the first fractionator 40 are introduced into the middle distillate hydrotreating reactor 52. The liquid hydrocarbon compounds of the naphtha fraction (mainly $C_5$ to $C_{10}$) discharged from the top of the first fractionator 40 are introduced into the naphtha fraction hydrotreating reactor 54.

The wax fraction hydrocracking reactor 50 hydrocracks the liquid hydrocarbon compounds of the high-carbon number wax fraction (hydrocarbons of approximately $C_{21}$ or higher) discharged from the bottom of the first fractionator 40 by using the hydrogen gas supplied from the above hydrogen separator 26 to reduce the carbon number to 20 or less. In this hydrocracking reaction, C—C bonds of hydrocarbon compounds with a large carbon number are cleaved. This process converts the hydrocarbon compounds with a large carbon number to hydrocarbon compounds with a smaller carbon number. Further, in the wax fraction hydrocracking reactor 50, the reaction for hydroisomerizing linear saturated hydrocarbon compounds (normal paraffins) to produce branched saturated hydrocarbon compounds (isoparaffins) proceeds in parallel with the hydrocracking reaction. This improves the low-temperature fluidity of the wax fraction hydrocracked product, which is a required property for a fuel oil base stock. Moreover, in the wax fraction hydrocracking reactor 50, a hydrodeoxygenation reaction of oxygen-containing compounds such as alcohols, and a hydrogenation reaction of olefins, both of which may be contained in the wax fraction that functions as the feedstock, also proceed during the hydrocracking process. The products including the liquid hydrocarbon compounds hydrocracked and discharged from the wax fraction hydrocracking reactor 50 are introduced into the gas-liquid separator 56, and separated into a gas and a liquid. The separated liquid hydrocarbon compounds are introduced into the second fractionator 70, and the separated gas fraction (which includes hydrogen gas) is introduced into the middle distillate hydrotreating reactor 52 and the naphtha fraction hydrotreating reactor 54.

In the middle distillate hydrotreating reactor 52, the liquid hydrocarbon compounds of the middle distillate equivalent to kerosene and gas oil, which have a mid-range carbon number (of approximately $C_{11}$ to $C_{20}$) and have been discharged from the middle section of the first fractionator 40, are hydrotreated. In the middle distillate hydrotreating reactor 52, hydrogen gas supplied from the hydrogen separator 26 via the wax fraction hydrocracking reactor 50 is used for the hydrotreating. In this hydrotreating reaction, olefins contained in the above liquid hydrocarbon compounds are hydrogenated to produce saturated hydrocarbon compounds, and oxygen-containing compounds such as alcohols contained in the liquid hydrocarbon compounds are hydrodeoxygenated and converted into saturated hydrocarbon compounds and water. Moreover, in this hydrotreating reaction, a hydroisomerization reaction that isomerizes linear saturated hydrocarbon compounds (normal paraffins) and converts them into branched saturated hydrocarbon compounds (isoparaffins) also proceeds, thereby improving the low-temperature fluidity of the product oil, which is a required property for a fuel oil. The product including the hydrotreated liquid hydrocarbon compounds is separated into a gas and a liquid in the gas-liquid separator 58.

The separated liquid hydrocarbon compounds are introduced into the second fractionator 70, and the separated gas fraction (which includes hydrogen gas) is reused for the above hydrogenation reaction.

In the naphtha fraction hydrotreating reactor 54, the liquid hydrocarbon compounds of the naphtha fraction, which have a low carbon number (approximately $C_{10}$ or less) and have been discharged from the top of the first fractionator 40, are hydrotreated. In the naphtha fraction hydrotreating reactor 54, hydrogen gas supplied from the hydrogen separator 26 via the wax fraction hydrocracking reactor 50 is used for the hydrotreating. As a result, a product including the hydrotreated liquid hydrocarbon compounds is separated into a gas and a liquid in the gas-liquid separator 60. The separated liquid hydrocarbon compounds are introduced into the naphtha stabilizer 72, and the separated gas fraction (which includes hydrogen gas) is reused for the above hydrogenation reaction. In this naphtha fraction hydrotreating process, the main reactions that proceed are the hydrogenation of olefins and the hydrodeoxygenation of oxygen-containing compounds such as alcohol.

In the second fractionator 70, the liquid hydrocarbon compounds supplied from the wax fraction hydrocracking reactor 50 and the middle distillate hydrotreating reactor 52 in the manner described above are fractionally distilled into hydrocarbon compounds with a carbon number of $C_{10}$ or less (with boiling points lower than approximately 150° C.), a kerosene fraction (with a boiling point of approximately 150 to 250° C.), a gas oil fraction (with a boiling point of approximately 250 to 350° C.) and an uncracked wax fraction (with a boiling point exceeding approximately 350° C.) from the wax fraction hydrocracking reactor 50. The uncracked wax fraction is obtained from the bottom of the second fractionator 70, and this is recycled to a position upstream of the wax fraction hydrocracking reactor 50.

Kerosene and gas oil are discharged from the middle section of the second fractionator 70. Meanwhile, gaseous hydrocarbon compounds of $C_{10}$ or less are discharged from the top of the second fractionator 70 and introduced into the naphtha stabilizer 72.

In the naphtha stabilizer 72, the hydrocarbon compounds of $C_{10}$ or less, which have been supplied from the naphtha fraction hydrotreating reactor 54 and fractionally distilled in the second fractionator 70, are distilled, and naphtha ($C_5$ to $C_{10}$) is obtained as a product. Accordingly, high-purity naphtha is discharged from the bottom of the naphtha stabilizer 72. Meanwhile, an off-gas including mainly hydrocarbon compounds with a predetermined carbon number or less ($C_4$ or less), which is not a targeted product, is discharged from the top of the naphtha stabilizer 72. This off-gas is used as a fuel gas, or alternatively, a fuel equivalent to LPG may be recovered from the off-gas.

(Method for Stopping Operation of a Reactor)

In this case, the FT synthesis unit 5 is provided with a steam supply portion 82 and an air supply portion 84 which respectively supply steam and air to the bottom of the reactor 30 as well as a concentration determination portion 86 which determines the respective concentrations of a carbon monoxide gas and an oxygen gas in gaseous matters discharged from the reactor 30.

The steam supply portion 82 supplies into the reactor 30 steam higher in temperature than the decomposition temperatures of metal carbonyls, for example, a temperature higher than 60° C. and lower than approximately 200° C. in the present embodiment. As the steam, there may be used, for example, steam generated from other constituents inside the FT synthesis unit 5.

The concentration determination portion 86 determines the respective concentrations of a carbon monoxide gas and an oxygen gas contained in the gaseous matters in order to determine gaseous matters flowing through a discharge line 88 connected to the top of the reactor 30.

The discharge line 88 is connected between the top of the reactor 30 and the gas-liquid separator 38.

Then, in the present embodiment, the steam supply portion 82, the air supply portion 84 and the concentration determination portion 86 are used to produce hydrocarbon compounds by the FT synthesis reaction inside the reactor 30. Thereafter, operation of the reactor 30 is stopped. Hereinafter, a description will be given of a method for stopping operation of the reactor 30 (a method for stopping operation of the reactor).

First, the stop step is conducted to stop the supply of a synthesis gas into the reactor 30. Thereby, the FT synthesis reaction inside the reactor 30 and synthesis of hydrocarbon compounds resulting from this reaction are stopped.

Thereafter, the slurry discharge step is conducted to discharge slurry from the reactor 30. At this time, the slurry is discharged, for example, from a slurry discharge port (not shown in the drawing) disposed at the bottom of the reactor 30.

Next, the inert gas filling step is conducted to fill an inert gas into the reactor 30.

At this time, for example, a gas supply portion (not shown in the drawing) is used to supply an inert gas from the bottom of the reactor 30, and gaseous matters inside the reactor 30 are discharged through the discharge line 88, by which the inert gas is used to conduct a purge inside the reactor 30. As the inert gas, for example, a nitrogen gas and a rare gas and so on, may be used.

Then, in the present embodiment, after the slurry discharge step and the inert gas filling step, steam higher in temperature than the decomposition temperatures of metal carbonyls is supplied into the reactor 30, thereby conducting the steam supply step of discharging gaseous matters inside the reactor 30. At this time, the steam supply portion 82 is used to supply steam to the reactor 30 from the bottom thereof and also discharge the gaseous matters inside the reactor 30 through the discharge line 88.

Here, in the steam supply step, the steam higher in temperature than the decomposition temperatures of the metal carbonyls is supplied into the reactor 30. Therefore, it is possible to decompose the metal carbonyls inside the reactor 30 into metal oxides and a carbon monoxide gas.

Further, at this time, gaseous matters inside the reactor 30 are discharged, by which a carbon monoxide gas generated through decomposition of the metal carbonyls can also be discharged from the reactor 30 to conduct a steam purge inside the reactor 30. Thereby, it is possible to prevent reproduction of metal carbonyls by the decomposed carbon monoxide gas after decomposition of the metal carbonyls.

Further, during the steam supply step, the carbon monoxide gas detecting step is conducted to detect an amount of carbon monoxide gas in gaseous matters discharged from the reactor 30. Then, supply of steam is stopped on the basis of a detected amount of the carbon monoxide gas detected by the carbon monoxide gas detecting step. In the present embodiment, the supply of steam is stopped when the amount of the detected carbon monoxide gas continuously declines to be lower than a predetermined reference value, for example, 50 vol ppm or lower. At this time, the concentration determination portion 86 is used to determine the amount of the carbon monoxide gas in gaseous matters which flow through the discharge line 88.

In this case, a carbon monoxide gas in the gaseous matters discharged from the reactor 30 is produced from decomposition of metal carbonyls inside the reactor 30. Therefore, the carbon monoxide gas is increased with an increase in residual amount of the metal carbonyls and decreased with a decrease in residual amount of the metal carbonyls. That is, an amount of carbon monoxide gas discharged from the reactor 30 has correlation with a residual amount of the metal carbonyls inside the reactor 30.

Therefore, during the steam supply step, the carbon monoxide gas detecting step is conducted to detect an amount of carbon monoxide gas in gaseous matters discharged from the reactor 30. Thereby, it is possible to estimate a residual amount of the metal carbonyls inside the reactor 30.

In other words, since the above-described correlation exists, a continuous decline in the amount of the detected carbon monoxide gas during the steam supply step indicates that a residual amount of metal carbonyls inside the reactor 30 is continuously decreased. Thus, when an amount of the detected carbon monoxide gas continuously declines to be less than a predetermined reference value, a residual amount of metal carbonyls inside the reactor 30 is reliably decreased.

A correlation between an amount of carbon monoxide gas discharged from the reactor 30 and a residual amount of metal carbonyls inside the reactor 30 can be grasped by conducting in advance a verification test, for example, before carrying out the method for stopping operation of the reactor 30. This verification test may include, for example, a method for determining separately an amount of carbon monoxide gas discharged from the reactor 30 and a residual amount of metal carbonyls inside the reactor 30 under the conditions which are made equal to the conditions under which the method for stopping operation of the reactor 30 is conducted.

After supply of steam is stopped to complete the steam supply step, air is supplied into the reactor 30, thereby conducting the air supply step to discharge gaseous matters inside the reactor 30. At this time, the air supply portion 84 is used to supply air to the reactor 30 from the bottom thereof. The gaseous matters inside the reactor 30 are also discharged through the discharge line 88.

Further, during the air supply step, the oxygen gas detecting step is conducted to detect the amount of oxygen gas contained in gaseous matters discharged from the reactor 30. Then, on the basis of the amount of detected oxygen gas detected in the oxygen gas detecting step, supply of air is stopped when the oxygen gas is contained, for example, at 20 vol % or more in terms of the content ratio inside the gaseous matters discharged from the reactor 30. At this time, the concentration determination portion 86 is used to determine the amount of oxygen gas contained in the gaseous matters flowing through the discharge line 88.

Here, in the air supply step, it is possible to estimate an amount of oxygen gas inside the reactor 30 on the basis of an amount of the detected oxygen gas discharged from the reactor 30.

Work for stopping operation of the reactor 30 is completed by the above-described procedures.

Thereafter, for example, an operator will be engaged in regular maintenance, repair and so on, inside the reactor 30.

As described so far, according to the method for stopping operation of the reactor 30 in the present embodiment, metal carbonyls inside the reactor 30 can be decomposed into metal oxides and a carbon monoxide gas. Also, it is possible to prevent reproduction of metal carbonyls by the decomposed carbon monoxide gas after decomposition of the metal carbonyls. Therefore, the metal carbonyls inside the reactor 30 can be effectively removed.

Further, since the inert gas filling step is conducted after the slurry discharge step and before the steam supply step, it is possible to fill an inert gas into the reactor 30 during the steam supply step. Thereby, metal carbonyls inside the reactor 30 can be effectively decomposed into metal oxides and a carbon monoxide gas during the steam supply step.

Further, during the steam supply step, supply of steam is stopped when an amount of the detected carbon monoxide gas continuously declines to be lower than a predetermined reference value. Therefore, it is possible to stop the supply of steam when a residual amount of metal carbonyls inside the reactor 30 is reliably decreased.

Still further, during the steam supply step as described above, the supply of steam is stopped on the basis of an amount of the detected carbon monoxide gas. Thereby, after the metal carbonyls have been sufficiently removed, steam is not supplied continuously into the reactor 30 but can be stopped. It is, thus, possible to smoothly stop operation of the reactor 30.

In addition, during the air supply step, the oxygen gas detecting step is conducted to estimate an amount of oxygen gas inside the reactor 30. Thus, it is possible to determine whether or not an oxygen gas exists at such an amount that can permit an operator to work inside the reactor 30, for example. It is, thereby, possible to smoothly stop operation of the reactor 30 even when an operator works inside the reactor 30, for example, after the air supply step.

The technical scope of the present invention shall not be limited to the above-described embodiment and may be modified in various ways within a scope not departing from the gist of the present invention. For example, the oxygen gas detecting step, the air supply step, or the inert gas filling step may not be provided.

Further, the application of the present invention shall not be limited to a case where operation of the reactor 30 in the liquid fuel synthesizing system 1 is stopped. The present invention is applicable to any case where a synthesis gas containing a carbon monoxide gas and a hydrogen gas is supplied into a slurry-accommodating reactor to stop operation of the reactor after synthesis of hydrocarbon compounds.

In addition, within a scope not departing from the gist of the present invention, constituents described in the above embodiment may be replaced with known constituents, whenever necessary, or the above-described modified example may be combined, whenever necessary.

INDUSTRIAL APPLICABILITY

The present invention relates to a method for stopping operation of a reactor in which a synthesis gas containing a carbon monoxide gas and a hydrogen gas is supplied into a slurry-accommodating reactor to stop operation of the reactor after synthesis of hydrocarbon compounds. The present invention is able to effectively remove metal carbonyls inside the reactor.

DESCRIPTION OF THE REFERENCE SIGNS

30: Slurry bubble column reactor (reactor)

The invention claimed is:

1. A method for stopping the operation of a reactor configured to accommodate a slurry and to synthesize hydrocarbon compounds by supplying a synthesis gas containing carbon monoxide gas and hydrogen gas to the reactor, the method comprising:
   a stop step of stopping the supply of the synthesis gas into the reactor;
   a slurry discharge step of discharging the slurry from the reactor after the stop step;
   an inert gas-filling step of filling an inert gas into the reactor from the bottom thereof after the slurry discharge step so as to purge gaseous matter from the reactor;
   a steam supply step of supplying steam that is higher in temperature than the decomposition temperature of metal carbonyls into the reactor from a bottom thereof after the inert gas filling step, thereby decomposing metal carbonyls inside the reactor and discharging the inert gas containing carbon monoxide gas generated by metal carbonyl decomposition from the reactor through a discharge line connected to a top of the reactor;
   a carbon monoxide gas detecting step of detecting the concentration of the carbon monoxide gas contained in the inert gas discharged from the reactor through the discharge line;
   a step of estimating the remaining amount of the metal carbonyls inside the reactor from the concentration of the carbon monoxide gas detected in the carbon monoxide gas-detecting step based on a correlation between the concentration of the carbon monoxide gas discharged from the reactor and the remaining amount of metal carbonyls inside the reactor, wherein the correlation is obtained by a previously performed verification test; and
   a step of stopping the supply of the steam when the concentration of the carbon monoxide gas is equal to or lower than a predetermined reference value.

2. The method for stopping operation of a reactor according to claim 1, further comprising:
   an air supply step of supplying air into the reactor from the bottom thereof after the steam supply step, thereby discharging the inert gas from the reactor through the discharge line;
   an oxygen gas detecting step of detecting the concentration of oxygen gas in the inert gas discharged from the reactor through the discharge line;
   a step of estimating an amount of the oxygen gas inside the reactor based on an the concentration of the oxygen gas detected in the oxygen gas detecting step; and
   a step of stopping the supply of the air on the basis of the amount of the oxygen gas inside the reactor.

* * * * *